US009578528B2

(12) United States Patent
Chen

(10) Patent No.: US 9,578,528 B2
(45) Date of Patent: Feb. 21, 2017

(54) METHOD AND DEVICE FOR HANDOVER STATISTICS

(71) Applicant: ZTE CORPORATION, Shenzhen, Guangdong Province (CN)

(72) Inventor: Liping Chen, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 14/652,318

(22) PCT Filed: Oct. 10, 2013

(86) PCT No.: PCT/CN2013/084998
§ 371 (c)(1),
(2) Date: Jun. 15, 2015

(87) PCT Pub. No.: WO2014/090032
PCT Pub. Date: Jun. 19, 2014

(65) Prior Publication Data
US 2015/0334585 A1    Nov. 19, 2015

(30) Foreign Application Priority Data

Dec. 14, 2012  (CN) .......................... 2012 1 0541399

(51) Int. Cl.
*H04W 24/08* (2009.01)
*H04W 24/04* (2009.01)
*H04W 36/08* (2009.01)
*H04W 84/00* (2009.01)

(52) U.S. Cl.
CPC ............. *H04W 24/08* (2013.01); *H04W 24/04* (2013.01); *H04W 36/08* (2013.01); *H04W 84/005* (2013.01)

(58) Field of Classification Search
CPC ...... H04W 36/30; H04W 36/32; H04W 88/04; H04W 88/08
USPC .................. 455/436, 437; 370/252, 329, 330
See application file for complete search history.

(56) References Cited

FOREIGN PATENT DOCUMENTS

| CN | 102291788 A | 12/2011 |
|---|---|---|
| CN | 102740344 A | 10/2012 |
| WO | WO 2012/134116 A2 | 10/2012 |

OTHER PUBLICATIONS

International Search Report (Form PCT/ISA/210) for PCT/CN2013/084998 mailed Jan. 16, 2014.

*Primary Examiner* — Sam Bhattacharya
(74) *Attorney, Agent, or Firm* — Koppel, Patrick, Heybl & Philpott

(57) ABSTRACT

The provides are a method and device for handover statistics, and the method includes: a base station receives a measurement job issued by a management system, wherein, the measurement job is used for indicating to collect statistics on one or more performance measurements of an inter-base station handover of a UE, and at least one of the following performance measurements for MRN: one or more performance measurements of an inter-base station handover of the MRN and one or more performance measurements of an intra-base station handover of the MRN. The base station collects statistics on one or more performance measurements indicated in the measurement job. It is solved the problem that the statistics on the inter-base station handover or intra-base station handover of the user is inaccurate, and achieves implementing the handover statistics of the MRN and increasing the accuration for collecting statistics on the handover of the UE.

14 Claims, 11 Drawing Sheets

METHOD AND DEVICE FOR HANDOVER STATISTICS

TECHNICAL FIELD

The disclosure relates to the field of communications, including e.g., a method and device for handover statistics.

BACKGROUND

In the existing mobile networks, a handover method is usually used to guarantee uninterruptible user services, so as to provide a better experience for users. In order to accurately know whether the user experience is good or bad, a user handover flow in a mobile network is required to be measured, and a handover success rate is counted according to the measurement result; the higher the success rate is, the better the user experience is, and the lower the success rate is, the worse the user experience is; and specific performance measurements may include the number of attempt times for preparing the inter-base station handover of a User Equipment (UE), the number of attempt times for executing the inter-base station handover of the UE, the number of success times for executing the inter-base handover of the UE, etc.

In a 3rd Generation Partnership Project (3GPP) Long-Term Evolution-Advanced (LTE-A) system, in order to provide high-quality services for passengers on moving public transport means, such as trains and buses, a Mobile Relay Node (MRN) cooperation transmission method is used. FIG. 1 is a schematic diagram of an application scenario of a MRN on a high-speed train in the related art; as shown in FIG. 1, a UE on the train is connected to the MRN, and the MRN accesses a nearby base station, wherein the base station supporting the MRN is also called a Donor eNB (DeNB). In the running process of the train, in order to provide uninterruptible connection services for the users, the MRN itself needs to perform inter-DeNB or intra-DeNB handover nearby the way along the track; and the UE accessed the MRN is unaware of the handover process of the MRN, and in fact, the handover of the MRN is a handover process of all the UE groups on the train accessing the MRN. If the inter-base station or intra-base station handover of the MRN fails, all the UEs connected to the MRN would be out-of-service, which will directly influence the experience of these users, and the purpose of providing high-quality services for the user groups in the manner of the MRN is not achieved. Therefore, it needs to collect statistics on the success rate of the inter-base station and intra-base station handover of the MRN, so as to evaluate the performance of the MRN system and the good or bad user perception of the UEs connected to the MRN; however, there is no performance measurement used for to collect statistics on the inter-base station or intra-base station handover of the MRN right now.

At the same time, since the handover flow of the MRN will re-use the existing handover flow of the UE, when the base station is a donor eNB, that is, when the base station supports that the MRN and the UE can access simultaneously, due to the fact that the existing method for collecting statistics on the performance measurements of the inter-base station handover of the UE does not distinguish whether each handover is the inter-base station handover of the UE or the inter-base station handover of the MRN in an actual statistical process, the statistical value is inaccurate, thus resulting the error of the calculated success rate of the inter-base station handover of the UE.

Therefore, the problems that no statistics is collected on the handover of the MRN, and the statistics of the inter-base station or intra-base station handover of the UE is inaccurate, thus rendering the error evaluation of the user experience in the related art.

SUMMARY

A method and device for handover statistics are provided in the embodiment of the disclosure, so as to at least solve the problems existing in the related art that no statistics is collected on the handover of the MRN, and the statistics of the inter-base station or intra-base station handover of the UE is inaccurate, thus rendering the error evaluation of the user experience.

According to one aspect of the disclosure, a method for handover statistics, comprising: receiving, by a base station, a measurement job issued by a management system, wherein the measurement job is used for indicating to collect statistics on one or more performance measurements of an inter-base station handover of a User Equipment, UE, and/or at least one of the following performance measurements for a Mobile Relay Node, MRN: one or more performance measurements of an inter-base station handover of the MRN and one or more performance measurements of an intra-base station handover of the MRN; and collecting, by the base station, statistics on one or more performance measurements indicated in the measurement job.

According to an embodiment of the disclosure, the one or more performance measurements indicated in the measurement job comprise at least one of the following: the number of attempt times for preparing the inter-base station handover of the MRN, the number of attempt times for executing the inter-base station handover of the MRN, and the number of success times for executing the inter-base handover of the MRN; the number of attempt times for executing the intra-base station handover of the MRN, and the number of success times for executing the intra-base handover of the MRN; and the number of attempt times for preparing the inter-base station handover of the UE, the number of attempt times for executing the inter-base station handover of the UE, and the number of success times for executing the inter-base handover of the UE.

According to an embodiment of the disclosure, in a case where the one or more performance measurements on which statistics is indicated to be collected in the measurement job are the number of attempt times for preparing the inter-base station handover of the MRN and the number of attempt times for preparing the inter-base station handover of the UE, collecting, by the base station, statistics according to the one or more performance measurements indicated in the measurement job comprises: judging, by the base station, whether a current handover is the inter-base station handover of the MRN or the inter-base station handover of the UE; sending, by the base station, a message representing a request for preparing an inter-base station handover; based on that a judgement result is that the current handover is the inter-base station handover of the MRN, adding 1 to the number of attempt times for preparing the inter-base station handover of the MRN; and based on that the judgement result is that the current handover is the inter-base station handover of the UE, adding 1 to the number of attempt times for preparing the inter-base station handover of the UE.

According to an embodiment of the disclosure, in a case where the one or more performance measurements on which statistics is indicated to be collected in the measurement job are the number of attempt times for executing the inter-base station handover of the MRN and the number of attempt times for executing the intra-base station handover of the MRN, collecting, by the base station, statistics according to the one or more performance measurements indicated in the measurement job comprises: judging, by the base station, whether a current handover is the inter-base station handover of the MRN or the intra-base station handover of the MRN; sending, by the base station, a message representing an attempt to execute an inter-base station handover to the MRN; based on that a judgement result is that the current handover is the inter-base station handover of the MRN, adding 1 to the number of attempt times for executing the inter-base station handover of the MRN; and based on that the judgement result is that the current handover is the intra-base station handover of the MRN, adding 1 to the number of attempt times for executing the intra-base station handover of the MRN.

According to an embodiment of the disclosure, in a case where the one or more performance measurements on which statistics is indicated to be collected in the measurement job are the number of success times for executing the inter-base handover of the MRN and the number of success times for executing the inter-base handover of the UE, collecting, by the base station, statistics according to the one or more performance measurements indicated in the measurement job comprises: receiving, by the base station, a message representing that an inter-base station handover is executed successfully; judging, by the base station, whether a current handover is the inter-base station handover of the MRN or the inter-base station handover of the UE; based on that a judgement result is that the current handover is the inter-base station handover of the MRN, adding 1 to the number of success times for executing the inter-base handover of the MRN; and based on that the judgement result is that the current handover is the inter-base station handover of the UE, adding 1 to the number of success times for executing the inter-base handover of the UE.

According to an embodiment of the disclosure, in a case where the one or more performance measurements on which statistics is indicated to be collected in the measurement job is the number of success times for executing the intra-base handover of the MRN, collecting, by the base station, statistics according to the one or more performance measurements indicated in the measurement job comprises: receiving, by the base station, a message representing that an intra-base station handover is executed successfully; judging, by the base station, whether a current handover is the intra-base station handover of the MRN or the inter-base station handover of the MRN; and based on that a judgement result is that the current handover is the intra-base station handover of the MRN, adding 1 to the number of success times for executing the intra-base handover of the MRN.

According to another aspect of the disclosure, a method for handover statistics, comprising: determining, by a management system, a measurement job, wherein the measurement job is used for indicating to collect statistics on one or more performance measurements of an inter-base station handover of a User Equipment, UE, and/or at least one of the following performance measurements for a Mobile Relay Node, MRN: one or more performance measurements of an inter-base station handover of the MRN and one or more performance measurements of an intra-base station handover of the MRN; and sending, by the management system, the determined measurement job to a base station, wherein the base station collects statistics on the one or more performance measurements indicated in the measurement job.

According to an embodiment of the disclosure, the management system is a Network Management System, NMS, and/or an Element Management System, EMS.

According to another aspect of the disclosure, a device for handover statistics, located in a base station, comprising: a receiving component, configured to receive a measurement job issued by a management system, wherein the measurement job is used for indicating to collect statistics on one or more performance measurements of an inter-base station handover of a User Equipment, UE, and/or at least one of the following performance measurements for a Mobile Relay Node, MRN: one or more performance measurements of an inter-base station handover of the MRN and one or more performance measurements of an intra-base station handover of the MRN; and a statistics component, configured to collect statistics on the one or more performance measurements indicated in the measurement job.

According to an embodiment of the disclosure, the statistics component comprises: a first judging element, configured to, in a case where the one or more performance measurements on which statistics is indicated to be collected in the measurement job are the number of attempt times for preparing the inter-base station handover of the MRN and the number of attempt times for preparing the inter-base station handover of the UE, judge whether a current handover is the inter-base station handover of the MRN or the inter-base station handover of the UE; a first sending element, configured to send a message representing a request for preparing an inter-base station handover; a first counter, configured to, based on that a judgement result of the first judging element is that this handover is the inter-base station handover of the MRN, add 1 to the number of attempt times for preparing the inter-base station handover of the MRN; and a second counter, configured to, based on that the judgement result of the first judging element is that this handover is the inter-base station handover of the UE, add 1 to the number of attempt times for preparing the inter-base station handover of the UE.

According to an embodiment of the disclosure, the statistics component comprises: a second judging element, configured to, in a case where the one or more performance measurements on which statistics is indicated to be collected in the measurement job are the number of attempt times for executing the inter-base station handover of the MRN and the number of attempt times for executing the intra-base station handover of the MRN, judge whether a current handover is the inter-base station handover of the MRN or the intra-base station handover of the MRN; a second sending element, configured to send a message representing an attempt to execute an inter-base station handover to the MRN; a third counter, configured to, based on that a judgement result of the second judging element is that this handover is the inter-base station handover of the MRN, add 1 to the number of attempt times for executing the inter-base station handover of the MRN; and a fourth counter, configured to, based on that the judgement result of the second judging element is that this handover is the intra-base station handover of the MRN, add 1 to the number of attempt times for executing the intra-base station handover of the MRN.

According to an embodiment of the disclosure, the statistics component comprises: a first receiving element, configured to receive a message representing that an inter-base station handover is executed successfully; a third judging element, configured to, in the case where the one or more performance measurements on which statistics is indicated to be collected in the measurement job are the number of success times for executing the inter-base handover of the MRN and the number of success times for executing the inter-base handover of the UE, judge whether a current handover is the inter-base station handover of the MRN or the inter-base station handover of the UE; a fifth counter, configured to, based on that a judgement result of the third judging element is that this handover is the inter-base station handover of the MRN, add 1 to the number of success times for executing the inter-base handover of the MRN; and a sixth counter, configured to, based on that the judgement result of the third judging element is that the inter-base station handover of the UE, add 1 to the number of success times for executing the inter-base handover of the UE.

According to an embodiment of the disclosure, the statistics component comprises: a second receiving element, configured to receive a message representing that an intra-base station handover is executed successfully; a fourth judging element, configured to, in a case where the one or more performance measurements on which statistics is indicated to be collected in the measurement job is the number of success times for executing the intra-base handover of the MRN, judging whether a current handover is the intra-base station handover of the MRN or the inter-base station handover of the MRN; and a seventh counter, configured to, based on that a judgement result of the fourth judging element is that this handover is the intra-base station handover of the MRN, add 1 to the number of success times for executing the intra-base handover of the MRN.

According to the other aspect of the disclosure, a device for handover statistics, located in a management system, comprising: a determining component, configured to determine a measurement job, wherein the measurement job is used for indicating to collect statistics on one or more performance measurements of an inter-base station handover of a User Equipment, UE, and/or at least one of the following performance measurements for a Mobile Relay Node, MRN: one or more performance measurements of an inter-base station handover of the MRN and one or more performance measurements of an intra-base station handover of the MRN; and a sending component, configured to send the determined measurement job to a base station, wherein the base station collects statistics on the one or more performance measurements indicated in the measurement job.

By means of the embodiment of the disclosure, a base station receives a measurement job issued by a management system, wherein the measurement job is used for indicating to collect statistics on one or more performance measurements of an inter-base station handover of a UE and/or at least one of the following performance measurements for an MRN: one or more performance measurements of an inter-base station handover of the MRN and one or more performance measurements of an intra-base station handover of the MRN; and the base station collects statistics on one or more performance measurements indicated in the measurement job, so that it is solved the problem in the related art that the statistics of the inter-base station or intra-base station handover of the UE is inaccurate, thus resulting in error evaluation of the user experience, thereby achieving the effects of collecting statistics on the handover of the MRN and increasing the accuracy of the statistics on the handover of the UE.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF EMBODIMENTS

The disclosure is described below with reference to the accompanying drawings and embodiments in detail. It should be noted that the embodiments of the present application and the characteristics of the embodiments can be combined with each other if there is no conflict.

Figure 1:
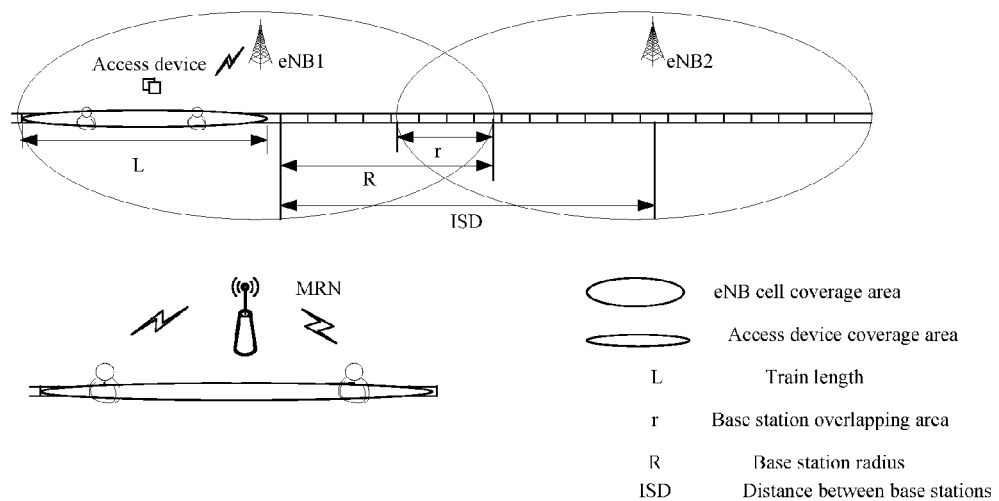
FIG. 1 is a schematic diagram of an application scenario of an MRN on a high-speed train in the related art.
Figure 2:
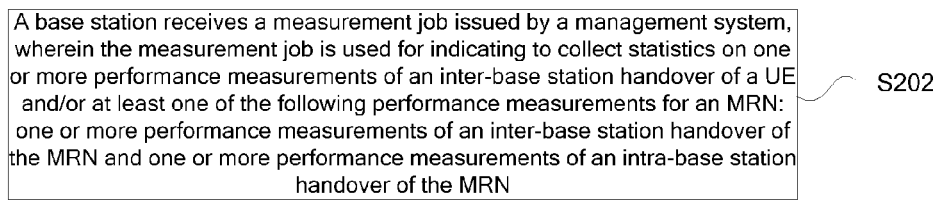
FIG. 2 is a flowchart of a method for handover statistics according to an embodiment of the disclosure.

A method for handover statistics is provided in the embodiment of the disclosure. FIG. 2 is a flowchart of a method for handover statistics according to an embodiment of the disclosure; as shown in FIG. 2, the flow includes the following steps:

Step S202, a base station receives a measurement job issued by a management system, wherein the measurement job is used for indicating to collect statistics on one or more performance measurements of an inter-base station handover of a UE and/or at least one of the following performance measurements for an MRN: one or more performance measurements of an inter-base station handover of the MRN and one or more performance measurements of an intra-base station handover of the MRN; and Step S204, the base station collects statistics on one or more performance measurements indicated in the measurement job.

By means of the steps, the base station distinguishes the inter-base station handover of the UE, the inter-base station handover of the MRN and the intra-base station handover of the MRN according to the measurement job issued by the management system. With respect to the situation of handover mixing of the UE and the MRN in the related art, the statistics is only collected on the handover realized by the UE, so that not only the problem of inaccurate handover statistics is solved, but also the accuracy of the handover success rate counted according to the handover statistics is increased.

According to an embodiment of the disclosure, the one or more performance measurements indicated in the measurement job may include at least one of the following: the number of attempt times for preparing the inter-base station handover of the MRN, the number of attempt times for executing the inter-base station handover of the MRN, and the number of success times for executing the inter-base station of the MRN; the number of attempt times for executing the intra-base station handover of the MRN, and the number of access times for executing the intra-base station handover of the MRN; and the number of attempt times for preparing the inter-base station handover of the UE, the number of attempt times for executing the inter-base station handover of the UE, and the number of success times for executing the inter-base handover of the UE.

According to that the one or more performance measurements indicated to be collected statistics in the measurement job are different, different processing methods may be used. For example, in the case where the one or more performance measurements on which statistics is indicated to be collected in the measurement job are the number of attempt times for preparing the inter-base station handover of the MRN and the number of attempt times for preparing the inter-base station handover of the UE, collecting, by the base station, statistics according to the one or more performance measurements indicated in the measurement job includes: firstly, the base station judges whether a current handover is the inter-base station handover of the MRN or the inter-base station handover of the UE; then the base station sends a message representing a request for preparing an inter-base station handover; based on that the judgement result is that the current handover is the inter-base station handover of the MRN and it is determined that the base station has sent the message representing the request for preparing the inter-base station handover, the base station adds 1 to the number of attempt times for preparing the inter-base station handover of the MRN; and based on that the judgement result is that the current handover is that this handover is the inter-base station handover of the UE and it is also determined that the base station has sent the message representing the request for preparing the inter-base station handover, the base station adds 1 to the number of attempt times for preparing the inter-base station handover of the UE.

For another example, in the case where the one or more performance measurements on which statistics is indicated to be collected in the measurement job are the number of attempt times for executing the inter-base station handover of the MRN and the number of attempt times for executing the intra-base station handover of the MRN, collecting, by the base station, statistics according to the one or more performance measurements indicated in the measurement job includes: firstly, the base station judges whether a current handover is the inter-base station handover of the MRN or the intra-base station handover of the MRN; the base station sends a message representing an attempt to execute an inter-base station handover to the MRN; based on that the judgement result is that the current handover is the inter-base station handover of the MRN and it is determined that the base station has sent the message representing an attempt to execute the inter-base station handover to the MRN, the base station adds 1 to the number of attempt times for executing the inter-base station handover of the MRN; and based on that the judgement result is that the current handover is the intra-base station handover of the MRN and it is determined that the base station has sent a message representing the attempt to execute the inter-base station handover to the MRN, the base station adds 1 to the number of attempt times for executing the intra-base station handover of the MRN.

For yet another example, in the case where the one or more performance measurements on which statistics is indicated to be collected in the measurement job are the number of success times for executing the inter-base handover of the MRN and the number of success times for executing the inter-base handover of the UE, collecting, by the base station, statistics according to the one or more performance measurements indicated in the measurement job includes: firstly, the base station receives a message representing that an inter-base station handover is executed successfully; then the base station judges whether a current handover is the inter-base station handover of the MRN or the inter-base station handover of the UE; based on that the judgement result is that the current handover is the inter-base station handover of the MRN and it is determined that the base station has received the message which represents the inter-base station handover is executed successfully, the base station adds 1 to the number of success times for executing the inter-base handover of the MRN; and based on that the judgement result is that the current handover is the inter-base station handover of the UE, the base station adds 1 to the number of success times for executing the inter-base handover of the UE.

For still another example, in the case where the one or more performance measurements on which statistics is indicated to be collected in the measurement job is the number of success times for executing the intra-base handover of the MRN, collecting, by the base station, statistics according to the one or more performance measurements indicated in the measurement job includes: firstly, the base station receives a message representing that an intra-base station handover is executed successfully; then the base station judges whether a current handover is the intra-base station handover of the MRN or the inter-base station handover of the MRN; and based on that the judgement result is that the current handover is the intra-base station handover of the MRN and it is determined that the base station has received the message which represents the intra-base station handover is executed successfully, the base station adds 1 to the number of success times for executing the intra-base handover of the MRN.

Figure 3:
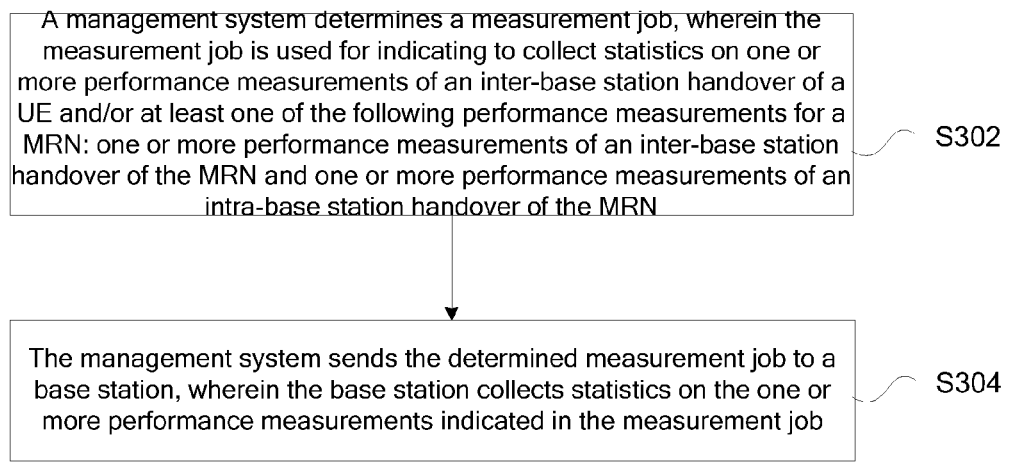
FIG. 3 is a flowchart of a method for handover statistics according to an embodiment of the disclosure.

Another method for handover statistics is further provided in the embodiment of the disclosure. FIG. 3 is a flowchart of a method for handover statistics according to an embodiment of the disclosure; as shown in FIG. 3, the method includes:

Step S302, a management system determines a measurement job, wherein the measurement job is used for indicating to collect statistics on one or more performance measurements of an inter-base station handover of a UE and/or at least one of the following performance measurements for a MRN: one or more performance measurements of an inter-base station handover of the MRN and one or more performance measurements of an intra-base station handover of the MRN; and Step S304, the management system sends the determined measurement job to a base station, wherein the base station collects statistics on the one or more performance measurements indicated in the measurement job. Optionally, the management system may be an NMS and/or an EMS; and in the case where the management system is the EMS and the NMS, the NMS sends the measurement job to the EMS through a northbound interface firstly, and then the EMS sends the measurement job to the base station.

In this embodiment, a device for handover statistics is further provided, and the device is used for realizing the embodiment and example implementations, and which have been described need not be described redundantly. As used in the following, the term "component" may realize a combination of software and/or hardware with a pre-determined function. Although the device described in the following embodiments is better realized by software, the implementation thereof through software or a combination of software and software is also possible and contemplated.

Figure 4:
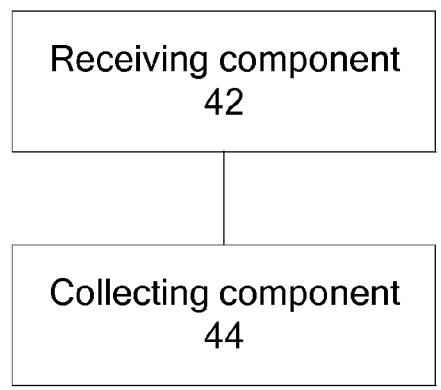
FIG. 4 is a structural diagram of a device for handover statistics according to an embodiment of the disclosure.

FIG. 4 is a structural diagram of a device for handover statistics according to an embodiment of the disclosure; as shown in FIG. 4, the device includes a receiving component 42 and a statistics component 44. Wherein the device is located in a base station and the device for handover statistics is described below.

The receiving component 42 is configured to receive a measurement job issued by a management system, wherein the measurement job is used for indicating to collect statistics on one or more performance measurements of an inter-base station handover of a UE, and/or at least one of the following performance measurements of an MRN: one or more performance measurements of an inter-base station handover of the MRN and one or more performance measurements of an intra-base station handover of the MRN; and the statistics component 44 is connected to the receiving component 42 and is configured to collect statistics on the one or more performance measurements indicated in the measurement job.

Figure 5:
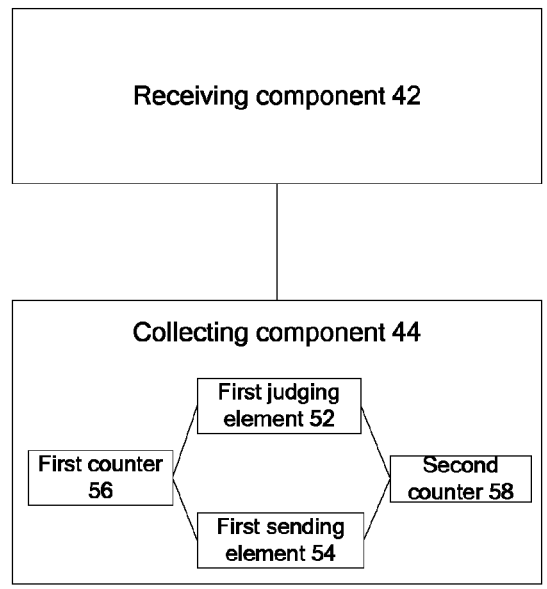
FIG. 5 is a structural diagram of a statistics component 44 in a device for handover statistics according to an example embodiment of the disclosure.

FIG. 5 is a structural diagram of a statistics component 44 in the device for handover statistics according to an example embodiment of the disclosure; as shown in FIG. 5, the statistics component 44 includes a first judging element 52, a first sending element 54, a first counter 56 and a second counter 58, and the statistics component 44 is described below.

The first judging element 52 is configured to, in the case where the one or more performance measurements on which statistics is indicated to be collected in the measurement job are the number of attempt times for preparing the inter-base station handover of the MRN and the number of attempt times for preparing the inter-base station handover of the UE, judge whether a current handover is the inter-base station handover of the MRN or the inter-base station handover of the UE; the first sending element 54 is configured to send a message representing a request for preparing an inter-base station handover; the first counter 56, connected to the first judging element 52 and first sending element 54, is configured to, based on that the judgement result of the first judging element 52 is that this handover is the inter-base station handover of the MRN, add 1 to the number of attempt times for preparing the inter-base station handover of the MRN; and the second counter 58, connected to the first judging element 52 and first sending element 54, is configured to, based on that the judgement result of the first judging element 52 is that this handover is the inter-base station handover of the UE, add 1 to the number of attempt times for preparing the inter-base station handover of the UE.

Figure 6:
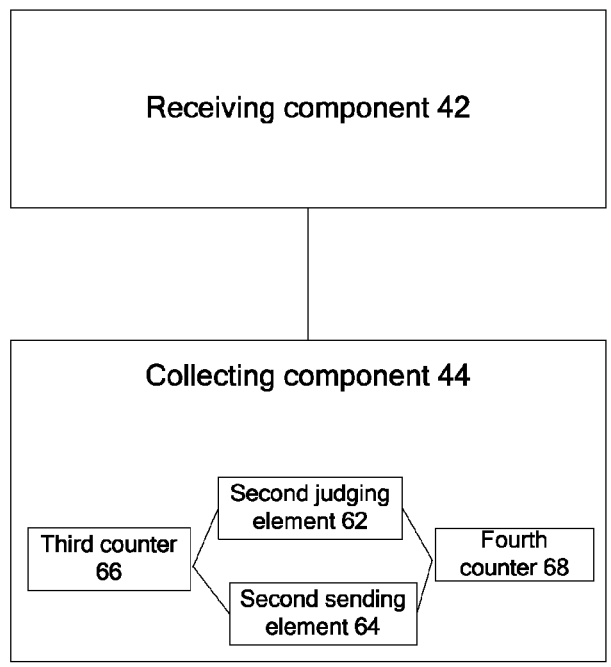
FIG. 6 is a structural diagram of a statistics component 44 in a device for handover statistics according to an example embodiment of the disclosure.

FIG. 6 is a structural diagram of a statistics component 44 in the device for handover statistics according to an example embodiment of the disclosure; as shown in FIG. 6, the statistics component 44 includes a second judging element 62, a second sending element 64, a third counter 66 and a fourth counter 68, and the statistics component 44 is described below.

The second judging element 62 is configured to, in the case where the one or more performance measurements on which statistics is indicated to be collected in the measurement job are the number of attempt times for executing the inter-base station handover of the MRN and the number of attempt times for executing the intra-base station handover of the MRN, judge whether a current handover is the inter-base station handover of the MRN or the intra-base station handover of the MRN; the second sending element 64 is configured to send a message representing an attempt to execute an inter-base station handover to the MRN; the third counter 66, connected to the second judging element 62 and second sending element 64, is configured to, based on that the judgement result of the second judging element 62 is that this handover is the inter-base station handover of the MRN, add 1 to the number of attempt times for executing the inter-base station handover of the MRN; and the fourth counter 68 is configured to, based on that the judgement result of the second judging element 62 is that this handover is the intra-base station handover of the MRN, add 1 to the number of attempt times for executing the intra-base station handover of the MRN.

Figure 7:
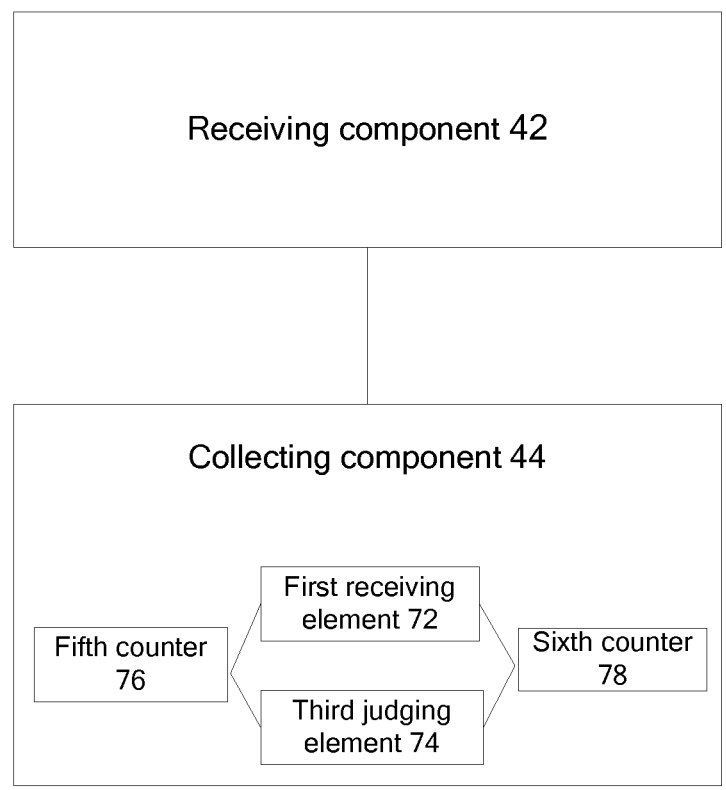
FIG. 7 is a structural diagram of a statistics component 44 in a device for handover statistics according to an example embodiment of the disclosure.

FIG. 7 is a structural diagram of a statistics component 44 in the device for handover statistics according to an example embodiment of the disclosure; as shown in FIG. 7, the statistics component 44 includes a first receiving element 72, a third judging element 74, a fifth counter 76 and a sixth counter 78, and the statistics component 44 is described below.

The first receiving element 72 is configured to receive a message representing that an inter-base station handover is executed successfully; the third judging element 74 is configured to, in the case where the one or more performance measurements on which statistics is indicated to be collected in the measurement job are the number of success times for executing the inter-base handover of the MRN and the number of success times for executing the inter-base handover of the UE, judge whether a current handover is the inter-base station handover of the MRN or the inter-base station handover of the UE; the fifth counter 76, connected to the first receiving element 72 and third judging element 74, is configured to, based on that the judgement result of the third judging element is that this handover is the inter-base station handover of the MRN, add 1 to the number of success times for executing the inter-base handover of the MRN; and the sixth counter 78, connected to the first receiving element 72 and third judging element 74, is configured to, based on that the judgement result of the third judging element 74 is that the inter-base station handover of the UE, add 1 to the number of success times for executing the inter-base handover of the UE.

Figure 8:
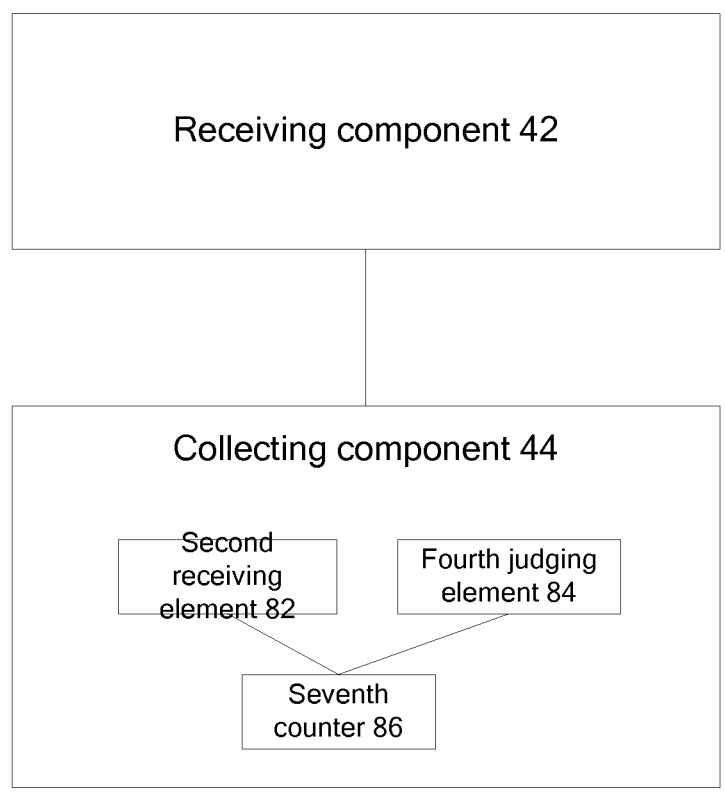
FIG. 8 is a structural diagram of a statistics component 44 in a device for handover statistics according to an example embodiment of the disclosure.

FIG. 8 is a structural diagram of a statistics component 44 in the device for handover statistics according to an example embodiment of the disclosure; as shown in FIG. 8, the statistics component 44 includes a second receiving element 82, a fourth judging element 84, a seventh counter 86, and the statistics component 44 is described below.

The second receiving element 82 is configured to receive a message representing that an intra-base station handover is executed successfully; the fourth judging element 84 is configured to, based on that the one or more performance measurements indicated to be collected statistics in the measurement job is the number of success times for executing the intra-base handover of the MRN, judge whether a current handover is the intra-base station handover of the MRN or the inter-base station handover of the MRN; the seventh counter 86, connected to the second receiving element 82 and fourth judging element 84, is configured to, based on that the judgement result of the fourth judging element 84 is that this handover is the intra-base station handover of the MRN, add 1 to the number of success times for executing the intra-base handover of the MRN.

Figure 9:
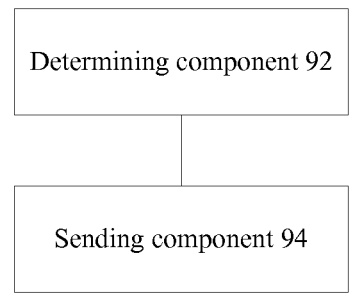
FIG. 9 is a structural diagram of a device for handover statistics according to an embodiment of the disclosure.

A device for handover statistics is further provided in the example embodiment of the disclosure. FIG. 9 is a structural diagram of the device for handover statistics according to an embodiment of the disclosure; as shown in FIG. 9, the device, located in a management system, includes a determining component 92 and a sending component 94, and the device is described below.

The determining component 92 is configured to determine a measurement job, wherein the measurement job is used for indicating to collect statistics on one or more performance measurements of an inter-base station handover of a UE and/or at least one of the following performance measurements for a MRN: one or more performance measurements of an inter-base station handover of the MRN and one or more performance measurements of an intra-base station handover of the MRN; and the sending component 94, connected to the determining component 92, is configured to send the determined measurement job to a base station, wherein the base station collects statistics on the one or more performance measurement indicated in the measurement job.

In order to collect accurate statistics on the success rate of the inter-base station and/or intra-base station handover of the MRN, so as to evaluate the performance of the MRN and reflect that the user perception under the MRN is good or bad, in this embodiment, a method for collecting statistics on the handover of the MRN is provided. By means of the method, the user experience of UEs connected under the MRN can be effectively evaluated and the statistics of the inter-base station handover success rate of the UE can be more accurate. The overall steps of the method are described as follows:

S1, a management system issues a performance measurement job, wherein the performance measurement job includes relevant performance measurements for collecting statistics on the inter-base station or intra-base station handover of the MRN and relevant performance measurements of inter-base station handover of a UE;

S2, a base station receives the measurement job and collects statistics on measurement values of the relevant performance measurements of the inter-base station or intra-base station handover of the MRN in a cell and the measurement values of the relevant performance measurements of the inter-base station handover of the UE in a measurement period; and S3, the base station sends the measurement result to a management system or sends a notification to the management system in the reporting time, wherein the notification includes relevant information for the management system being able to acquire a measurement data file containing the measurement values. The management system may be an EMS and/or an NMS.

The relevant performance measurements of the inter-base station handover of the MRN include the number of attempt times for preparing the inter-base station handover of the MRN, the number of attempt times for executing the inter-base station handover of the MRN, and the number of success times for executing the inter-base station handover of the MRN; the relevant performance measurements of the intra-base station handover of the MRN include the number of attempt times for executing the intra-base station handover of the MRN and the number of success times for executing the intra-base station handover of the MRN; and the relevant performance measurements of the inter-base station of the UE include the number of attempt times for preparing the inter-base station handover of the UE, the number of attempt times for executing the inter-base station handover of the UE and the number of success times for executing the inter-base station handover of the UE.

The statistics method for collecting the statistics on each handover times is described below.

(I). The method for the base station collecting statistics on the number of attempt times for preparing the inter-base station handover of the MRN and the number of attempt times for preparing the inter-base station handover of the UE is as follows:

1) the base station judges whether a current handover is the inter-base station handover of the MRN or the inter-base station handover of the UE;

2) the base station sends a signalling message representing a request for preparing an inter-base station handover;

3) when the judgement result is that the current handover is the inter-base station handover of the MRN, the base station adds 1 to the number of attempt times for preparing the inter-base station handover of the MRN; and 4) when the judgement result is that the current handover is the inter-base station handover of the UE, the base station adds 1 to the number of attempt times for preparing the inter-base station handover of the UE.

(II). The method for the base station collecting statistics on the number of attempt times for executing the inter-base station handover of the MRN and the number of attempt times for executing the intra-base station handover of the MRN is as follows:

1) the base station judges whether a current handover is the inter-base station handover of the MRN or the intra-base station handover of the MRN;

2) the base station sends a signalling message representing an attempt to execute an inter-base station handover to the MRN;

3) when the judgement result is that the current handover is the inter-base station handover of the MRN, the base station adds 1 to the number of attempt times for executing the inter-base station handover of the MRN; and 4) when the judgement result is that the current handover is the intra-base station handover of the MRN, the base station adds 1 to the number of attempt times for executing the intra-base station handover of the MRN.

(III). The method for the base station collecting statistics on the number of attempt times for executing the inter-base station handover of the UE is as follows:

1) the base station sends a signalling message which represents that an inter-base station handover of the UE is attempt to execute; and 2) the base station adds 1 to the number of attempt times for executing the inter-base station handover of the UE.

(IV). The method for the base station collecting statistics on the number of success times for executing the inter-base handover of the MRN and the number of success times for executing the inter-base handover of the UE is as follows:

1) the base station receives a signalling message which represents an inter-base station handover of the UE is executed successfully;

2) the base station judges whether a current handover is the inter-base station handover of the MRN or the inter-base station handover of the UE;

3) when the judgement result is that the current handover is the inter-base station handover of the MRN, the base station adds 1 to the number of success times for executing the inter-base handover of the MRN; and 4) when the judgement result is that the current handover is the inter-base station handover of the UE, the base station adds 1 to the number of success times for executing the inter-base handover of the UE.

(V). The method for the base station collecting statistics on the number of success times for executing the intra-base handover of the MRN is as follows:

1) the base station receives a signalling message which represents that an intra-base station handover of the MRN is executed successfully;

2) the base station judges whether a current handover is the intra-base station handover of the MRN or the inter-base station handover of the MRN; and 3) when the judgement result is that the current handover is the intra-base station handover of the MRN, the base station adds 1 to the number of success times for executing the intra-base handover of the MRN; otherwise, the base station does not performs the adding operation.

Compared with the method for collecting the statistics on the number of attempt times for preparing the inter-base station handover of the UE, the number of attempt times for executing the inter-base station handover of the UE and the number of success times for executing the inter-base handover of the UE in the related art, the statistics method makes the statistics result more accurate by judging whether each handover is the inter-base station handover of the UE or the inter-base station handover of the MRN, and the success rate of the inter-base station handover of the UE calculated according to the statistical values is more guiding significance. At the same time, the statistics on the number of attempt times for preparing the inter-base station handover of the MRN, the number of attempt times for executing the inter-base station handover of the MRN, the number of success times for executing the inter-base handover of the MRN, the number of attempt times for executing the intra-base station handover of the MRN and the number of success times for executing the intra-base handover of the MRN are further added in the method, and according to the new statistical values, the success rate of the inter-base station handover of the MRN and the success rate of the intra-base station handover of the MRN can be calculated, so as to perform effective evaluation on the user experience of the UEs connected to the MRN.

Figure 10:
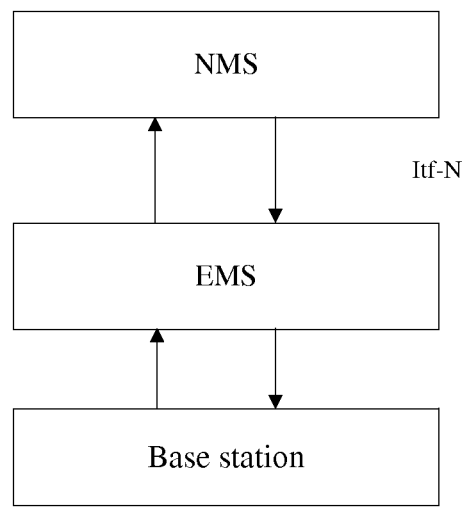
FIG. 10 is a schematic diagram for issuing a measurement job and reporting a measurement result through a northbound interface according to an embodiment of the disclosure.

FIG. 10 is a schematic diagram for issuing a measurement job and reporting a measurement result through a northbound interface according to an embodiment of the disclosure; as shown in FIG. 10:

1) a network management system issues a performance measurement job to an EMS through a northbound interface, wherein the performance measurement job includes the name of the relevant measurement of the inter-base station handover of a MRN, the name of the relevant measurement of the inter-base station handover of a UE and the name of the one or more performance measurements of intra-base station handover of the MRN;

2) the EMS receives the performance measurement job, and then the EMS issues the performance measurement job to a base station;

3) a base station collects statistics on the measurement value of the relevant performance measurement of the inter-base station handover of the MRN in a cell, the measurement value of the relevant performance measurement of the inter-base station handover of the UE and the measurement value of the relevant performance measurement of the intra-base station handover of the MRN in a measurement period;

4) the base station sends the measurement result to the EMS or sends a notification to the EMS in the reporting time, wherein the EMS acquires a measurement data file containing the measurement values according to file information carried in the notification and saves the measurement data file; and 5) the EMS sends the notification to the NMS through the northbound interface, wherein the NMS acquires the measurement data file according to the file information carried in the notification.

Figure 11:
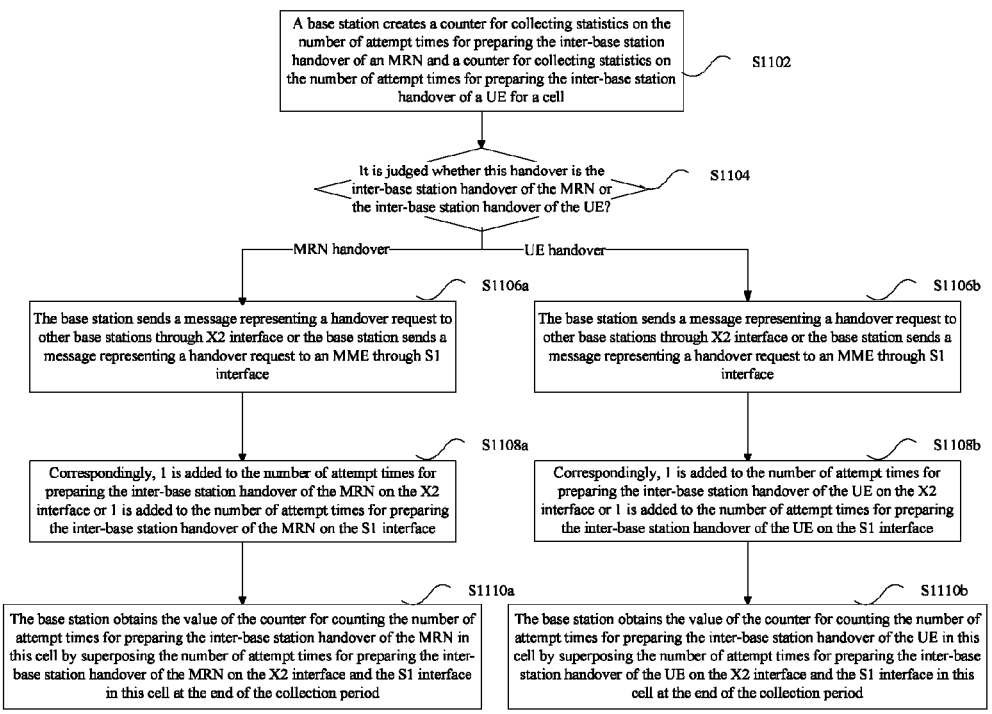
FIG. 11 is a schematic diagram for collecting statistics on the number of attempt times for preparing the inter-base station handover of a mobile relay node and a UE according to an embodiment of the disclosure.

FIG. 11 is a schematic diagram for collecting statistics on the number of attempt times for preparing the inter-base station handover of a MRN and the number of attempt times for preparing the inter-base station handover of a UE according to an embodiment of the disclosure; as shown in FIG. 11:

Step S1102, a base station creates a counter for collecting statistics on the number of attempt times for preparing the inter-base station handover of an MRN and a counter for collecting statistics on the number of attempt times for preparing the inter-base station handover of a UE for a cell;

Step S1104, the base station judges whether a current handover is the inter-base station handover of the MRN or the inter-base station handover of the UE;

Step S1106, the base station needs to collect the statistics on X2 interface and S1 interface respectively, Step S1106a, the base station sends, on the X2 interface, a message (HANDOVER REQUEST) representing a handover request to other eNBs, and sends, on the S1 interface, a message (HANDOVER REQUIRED) representing a handover request to an MME;

Step S1106b, the base station sends, on the X2 interface, a message (HANDOVER REQUEST) representing a handover request to other eNBs, and sends, on the S1 interface, a message (HANDOVER REQUIRED) representing a handover request to an MME;

Step S1108a, when this handover is the inter-base station handover of the MRN, 1) 1 is added to the number of attempt times for preparing the inter-base station handover of the MRN on the X2 interface;

2) 1 is added to the number of attempt times for preparing the inter-base station handover of the MRN on the S1 interface;

Step S1108b, when this handover is the inter-base station handover of the UE, 1) 1 is added to the number of attempt times for preparing the inter-base station handover of the UE on the X2 interface;

2) 1 is added to the number of attempt times for preparing the inter-base station handover of the UE on the S1 interface;

Step S1110a, the base station obtains the value of the counter for counting the number of attempt times for preparing the inter-base station handover of the MRN in this cell by superposing the number of attempt times for preparing the inter-base station handover of the MRN on the X2 interface and the S1 interface in this cell at the end of the collection period; and Step S1110b, the value of the counter for counting the number of attempt times for preparing the inter-base station handover of the UE in this cell is obtained by superposing the number of attempt times for preparing the inter-base station handover of the UE on the X2 interface and the S1 interface in this cell.

Figure 12:
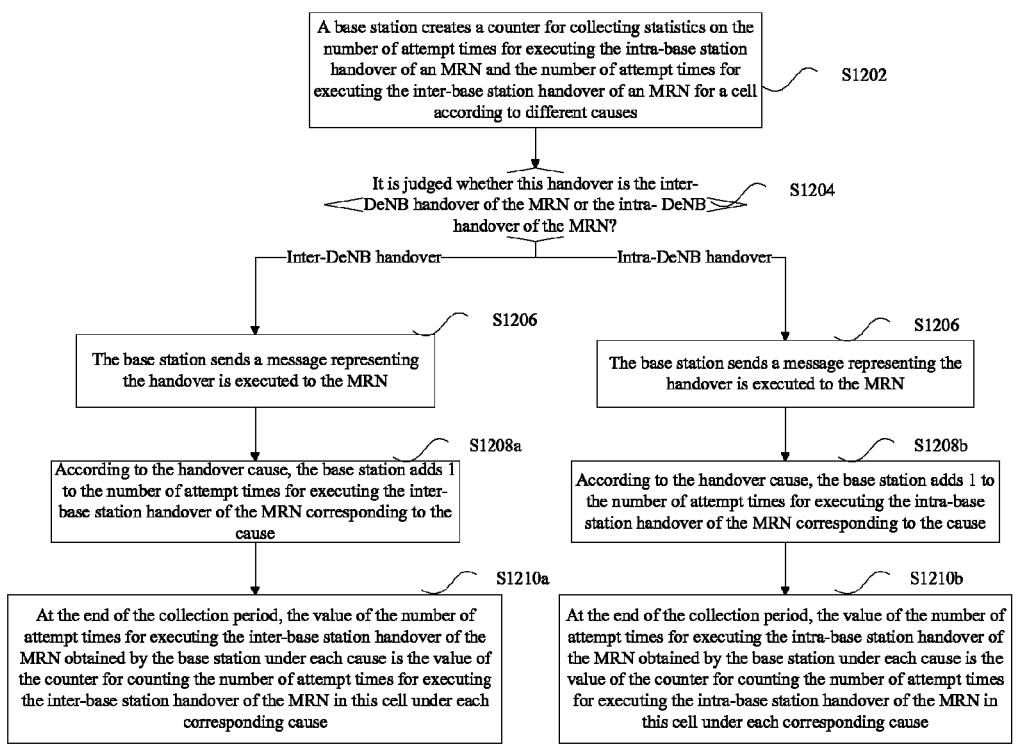
FIG. 12 is a schematic diagram for collecting statistics on inter-base station and the number of attempt times for executing the intra-base station handover of a mobile relay node according to an embodiment of the disclosure.

FIG. 12 is a schematic diagram for collecting statistics on inter-base station and the number of attempt times for executing the intra-base station handover of a MRN according to an embodiment of the disclosure; as shown in FIG. 12:

Step S1202, a base station creates a counter for collecting statistics on the number of attempt times for executing the inter-base station handover of an MRN and a counter for collecting statistics on the number of attempt times for executing the intra-base station handover of an MRN for a cell according to different causes, and the specific cause may be the Cause in 3GPP TS 32.413;

Step S1204, the base station judges whether a current handover is the intra-base station handover of the MRN or the inter-base station handover of the MRN;

Step S1206, the base station sends a message (RRC Connection Reconfiguration) which represents the handover is executed to the MRN;

Step S1208a, when this handover is the inter-base station handover of the MRN, according to the handover cause, the base station adds 1 to the number of attempt times for executing the inter-base station handover of the MRN corresponding to the cause;

Step S1208b, when this handover is the intra-base station handover of the MRN, according to the handover cause, the base station adds 1 to the number of attempt times for executing the intra-base station handover of the MRN corresponding to the cause;

Step S1210a, at the end of the collection period, the value of the number of attempt times for executing the inter-base station handover of the MRN obtained by the base station under each cause is the value of the counter for counting the number of attempt times for executing the inter-base station handover of the MRN in this cell under each corresponding cause; and Step S1210b, at the end of the collection period, the value of the number of attempt times for executing the intra-base station handover of the MRN obtained by the base station under each cause is the value of the counter for counting the number of attempt times of the intra-base station handover of the MRN in this cell under each corresponding cause.

Figure 13:
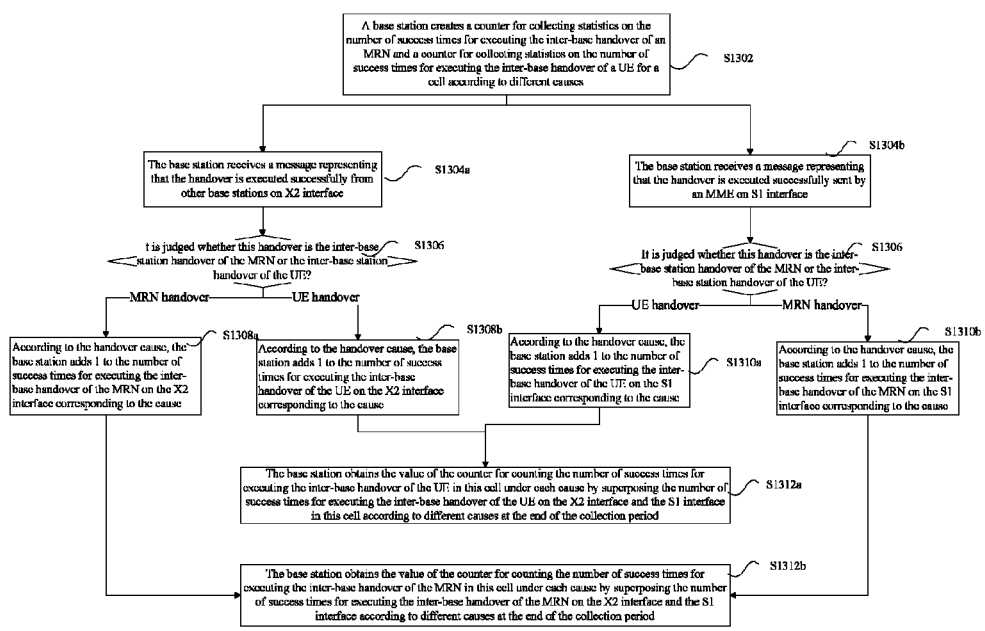
FIG. 13 is a schematic diagram for collecting statistics on the number of success times for executing the inter-base handover of a mobile relay node and a UE according to an embodiment of the disclosure.

FIG. 13 is a schematic diagram for collecting statistics on the number of success times for executing the inter-base handover of a MRN and the number of success times for executing the inter-base handover a UE according to an embodiment of the disclosure; as shown in FIG. 13:

Step S1302, a base station creates a counter for collecting statistics on the number of success times for executing the inter-base handover of an MRN under each cause and a counter for collecting statistics on the number of success times for executing the inter-base handover of a UE under each cause for a cell according to different causes, and the specific cause may be the Cause in 3GPP TS 32.413;

Step S1304, the base station needs to collect statistics on the X2 interface and the S1 interface respectively, that is, Step S1304a, the base station receives, on the X2 interface, a message (UECONTEXT RELEASE) which represents the handover is executed successfully from other base stations;

Step S1304b, the base station receives a message (UE-CONTEXT RELEASE COMMAND) which represents that the handover is executed successfully, wherein the message is sent by an MME on the S1 interface;

Step S1306, the base station judges whether a current handover is the inter-base station handover of the MRN or the inter-base station handover of the UE;

Step S1308, when this handover is the inter-base station handover of the MRN, that is, Step S1308a, according to the handover cause, the base station adds 1 to the number of success times for executing the inter-base handover of the MRN on the X2 interface corresponding to the cause;

Step S1308b, according to the handover cause, the base station adds 1 to the number of success times for executing the inter-base handover of the MRN on the S1 interface corresponding to the cause;

Step S1310, when this handover is the inter-base station handover of the UE, that is, Step S1310a, according to the handover cause, the base station adds 1 to the number of success times for executing the inter-base handover of the UE on the X2 interface corresponding to the cause;

Step S1310b, according to the handover cause, the base station adds 1 to the number of success times for executing the inter-base handover of the UE on the S1 interface corresponding to the cause;

Step S1312a, the base station obtains the value of the counter for counting the number of success times for executing the inter-base handover of the MRN in this cell under each cause by superposing the number of success times for executing the inter-base handover of the MRN on the X2 interface and the S1 interface in this cell according to different causes at the end of the collection period; and Step S1312b, the base station obtains the value of the counter for counting the number of success times for executing the inter-base handover of the UE in this cell under each cause by superposing the number of success times for executing the inter-base handover of the UE on the X2 interface and the S1 interface in this cell according to different causes at the end of the collection period.

Figure 14:
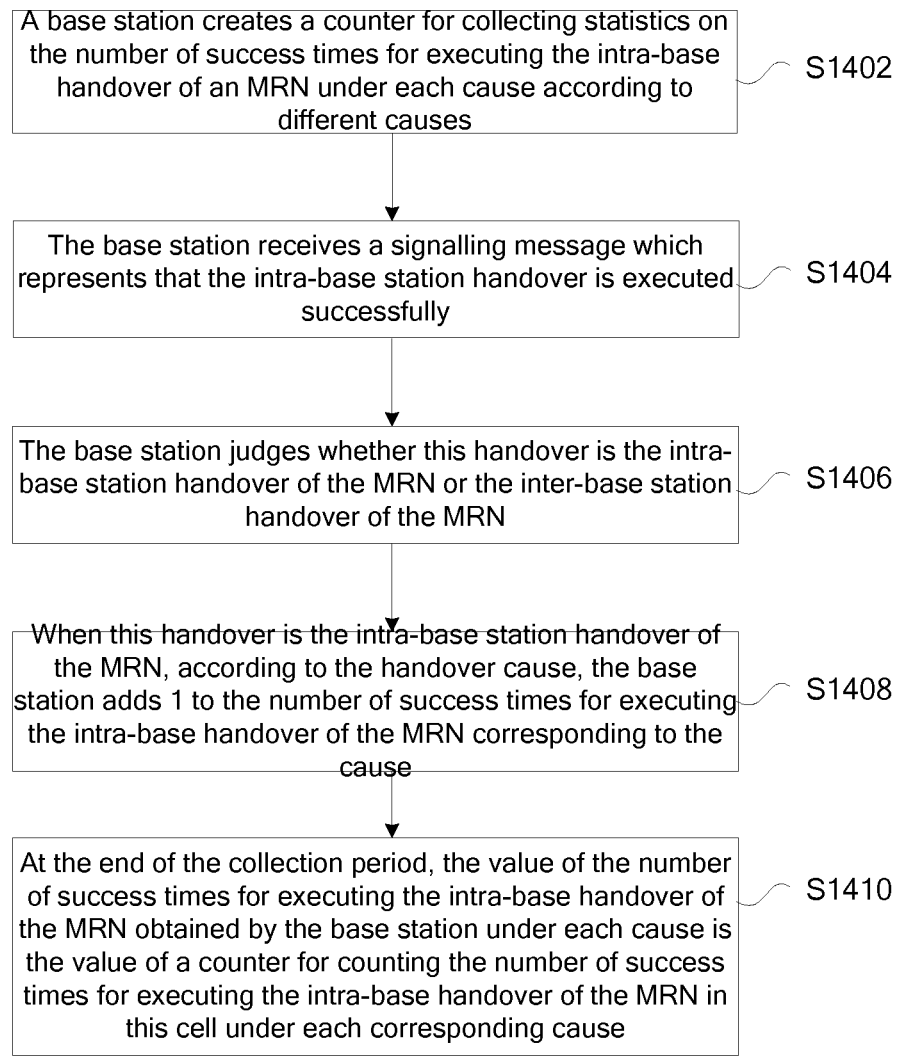
FIG. 14 is a schematic diagram for collecting statistics on the number of success times for executing the intra-base handover of an RN according to an embodiment of the disclosure.

FIG. 14 is a schematic diagram for collecting statistics on the number of success times for executing the intra-base handover of an MRN according to an embodiment of the disclosure; as shown in FIG. 14:

Step S1402, a base station creates a counter for collecting statistics on the number of success times for executing the intra-base handover of an MRN under each cause according to different causes, and the specific cause may be the Cause in 3GPP TS 32.413;

Step S1404, the base station receives a signalling message (RRC Connection Reconfiguration Complete) which represents the intra-base station handover is executed successfully;

Step S1406, the base station judges whether a current handover is the intra-base station handover of the MRN or the inter-base station handover of the MRN;

Step S1408, when this handover is the intra-base station handover of the MRN, according to the handover cause, the base station adds 1 to the number of success times for executing the intra-base handover of the MRN corresponding to the cause; otherwise, the base station does not perform the adding operation; and Step S1410, at the end of the collection period, the value of the number of success times for executing the intra-base handover of the MRN obtained by the base station under each cause is the value of a counter for counting the number of success times for executing the intra-base handover of the MRN in this cell under each corresponding cause.

Figure 15:
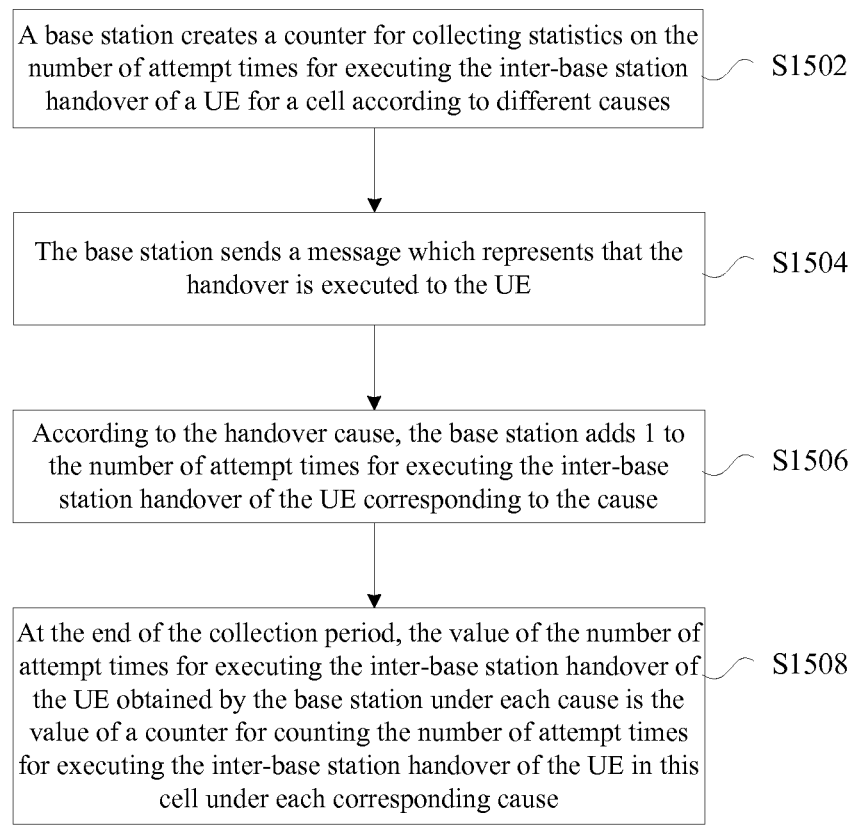
FIG. 15 is a schematic diagram for collecting statistics on the number of attempt times for executing the inter-base station handover of a UE according to an embodiment of the disclosure.

FIG. 15 is a schematic diagram for collecting statistics on the number of attempt times for executing the inter-base station handover of a UE according to an embodiment of the disclosure; as shown in FIG. 15:

Step S1502, a base station creates a counter for collecting statistics on the number of attempt times for executing the inter-base station handover of a UE for a cell according to different causes, and the specific cause may be the Cause in 3GPP TS 32.413;

Step S1504, the base station sends a message (RRC Connection Reconfiguration) which represents that the handover is executed to the UE;

Step S1506, according to the handover cause, the base station adds 1 to the number of attempt times for executing the inter-base station handover of the UE corresponding to the cause; and Step S1508, at the end of the collection period, the value of the number of attempt times for executing the inter-base station handover of the MRN obtained by the base station under each cause is the value of a counter for counting the number of attempt times for executing the inter-base station handover of the UE in this cell under each corresponding cause.

Apparently, those skilled in the art shall understand that the above components or steps of the disclosure can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, in some cases, can perform the shown or described step in sequence other than herein, or they are made into integrated circuit component respectively, or a plurality of components or steps thereof are made into one integrated circuit component. In this way, the disclosure is not restricted to any particular hardware and software combination.

The above description is only example embodiments of the present document and is not intended to limit the disclosure, and the disclosure can have a variety of changes and modifications for ordinary person skilled in the field. Any modification, equivalent replacement, or improvement made within the spirit and principle of the disclosure shall all fall within the protection scope as defined in the appended claims of the disclosure.

As stated above, the method and device for handover statistics is provided in the embodiments of the disclosure, which brings the following beneficial effects: it is solved the problems in the related art that the statistics of the inter-base station or intra-base station handover of the UE is inaccurate, thus rendering the error evaluation of the user experience, thereby achieving the effects of collecting statistics on the MRN handover and increasing the accuracy of the statistics on the handover of the UE.

What is claimed is:

1. A method for handover statistics, comprising:
receiving, by a base station, a measurement job issued by a management system, wherein the measurement job is used for indicating to collect statistics on one or more performance measurements of an inter-base station handover of a User Equipment (UE), and on at least one of the following performance measurements for a Mobile Relay Node (MRN): one or more performance measurements of an inter-base station handover of the MRN and one or more performance measurements of an intra-base station handover of the MRN; and
collecting, by the base station, statistics on one or more performance measurements indicated in the measurement job.

2. The method according to claim 1, wherein the one or more performance measurements indicated in the measurement job comprise at least one of the following:
the number of attempt times for preparing the inter-base station handover of the MRN, the number of attempt times for executing the inter-base station handover of the MRN, and the number of success times for executing the inter-base handover of the MRN; the number of attempt times for executing the intra-base station handover of the MRN, and the number of success times for executing the intra-base handover of the MRN; and the number of attempt times for preparing the inter-base station handover of the UE, the number of attempt times for executing the inter-base station handover of the UE, and the number of success times for executing the inter-base handover of the UE.

3. The method according to claim 2, wherein in a case where the one or more performance measurements on which statistics is indicated to be collected in the measurement job are the number of attempt times for preparing the inter-base station handover of the MRN and the number of attempt times for preparing the inter-base station handover of the UE, collecting, by the base station, statistics according to the one or more performance measurements indicated in the measurement job comprises:
judging, by the base station, whether a current handover is the inter-base station handover of the MRN or the inter-base station handover of the UE;
sending, by the base station, a message representing a request for preparing an inter-base station handover;
based on that a judgement result is that the current handover is the inter-base station handover of the MRN, adding 1 to the number of attempt times for preparing the inter-base station handover of the MRN; and
based on that the judgement result is that the current handover is the inter-base station handover of the UE, adding 1 to the number of attempt times for preparing the inter-base station handover of the UE.

4. The method according to claim 2, wherein in a case where the one or more performance measurements on which statistic is indicated to be collected in the measurement job are the number of attempt times for executing the inter-base station handover of the MRN and the number of attempt times for executing the intra-base station handover of the MRN, collecting, by the base station, statistics according to the one or more performance measurements indicated in the measurement job comprises:
judging, by the base station, whether a current handover is the inter-base station handover of the MRN or the intra-base station handover of the MRN;

sending, by the base station, a message representing an attempt to execute an inter-base station handover to the MRN;

based on that a judgement result is that the current handover is the inter-base station handover of the MRN, adding 1 to the number of attempt times for executing the inter-base station handover of the MRN; and based on that the judgement result is that the current handover is the intra-base station handover of the MRN, adding 1 to the number of attempt times for executing the intra-base station handover of the MRN.

5. The method according to claim 2, wherein in a case where the one or more performance measurements on which statistics is indicated to be collected in the measurement job are the number of success times for executing the inter-base handover of the MRN and the number of success times for executing the inter-base handover of the UE, collecting, by the base station, statistics according to the one or more performance measurements indicated in the measurement job comprises:

receiving, by the base station, a message representing that an inter-base station handover is executed successfully;

judging, by the base station, whether a current handover is the inter-base station handover of the MRN or the inter-base station handover of the UE;

based on that a judgement result is that the current handover is the inter-base station handover of the MRN, adding 1 to the number of success times for executing the inter-base handover of the MRN; and based on that the judgement result is that the current handover is the inter-base station handover of the UE, adding 1 to the number of success times for executing the inter-base handover of the UE.

6. The method according to claim 2, wherein in a case where the one or more performance measurements on which statistics is indicated to be collected in the measurement job is the number of success times for executing the intra-base handover of the MRN, collecting, by the base station, statistics according to the one or more performance measurements indicated in the measurement job comprises:

receiving, by the base station, a message representing that an intra-base station handover is executed successfully;

judging, by the base station, whether a current handover is the intra-base station handover of the MRN or the inter-base station handover of the MRN; and based on that a judgement result is that the current handover is the intra-base station handover of the MRN, adding 1 to the number of success times for executing the intra-base handover of the MRN.

7. A method for handover statistics, comprising:

determining, by a management system, a measurement job, wherein the measurement job is used for indicating to collect statistics on one or more performance measurements of an inter-base station handover of a User Equipment (UE), and on at least one of the following performance measurements for a Mobile Relay Node (MRN): one or more performance measurements of an inter-base station handover of the MRN and one or more performance measurements of an intra-base station handover of the MRN; and sending, by the management system, the determined measurement job to a base station, wherein the base station collects statistics on one or more performance measurements indicated in the measurement job.

8. The method according to claim 7, wherein the management system is a Network Management System, NMS, and/or an Element Management System, EMS.

9. A device for handover statistics, located in a base station, comprising:

a receiving component, configured to receive a measurement job issued by a management system, wherein the measurement job is used for indicating to collect statistics on one or more performance measurements of an inter-base station handover of a User Equipment (UE), and on at least one of the following performance measurements for a Mobile Relay Node (MRN): one or more performance measurements of an inter-base station handover of the MRN and one or more performance measurements of an intra-base station handover of the MRN; and a collecting component, configured to collect statistics on the one or more performance measurements indicated in the measurement job.

10. The device according to claim 9, wherein the statistics component comprises:

a first judging element, configured to, in a case where the one or more performance measurements on which statistics is indicated to be collected in the measurement job are the number of attempt times for preparing the inter-base station handover of the MRN and the number of attempt times for preparing the inter-base station handover of the UE, judge whether a current handover is the inter-base station handover of the MRN or the inter-base station handover of the UE;

a first sending element, configured to send a message representing a request for preparing an inter-base station handover;

a first counter, configured to, based on that a judgement result of the first judging element is that this handover is the inter-base station handover of the MRN, add 1 to the number of attempt times for preparing the inter-base station handover of the MRN; and a second counter, configured to, based on that the judgement result of the first judging element is that this handover is the inter-base station handover of the UE, add 1 to the number of attempt times for preparing the inter-base station handover of the UE.

11. The device according to claim 9, wherein the statistics component comprises:

a second judging element, configured to, in a case where the one or more performance measurements on which statistics is indicated to be collected in the measurement job are the number of attempt times for executing the inter-base station handover of the MRN and the number of attempt times for executing the intra-base station handover of the MRN, judge whether a current handover is the inter-base station handover of the MRN or the intra-base station handover of the MRN;

a second sending element, configured to send a message representing an attempt to execute an inter-base station handover to the MRN;

a third counter, configured to, based on that a judgement result of the second judging element is that this handover is the inter-base station handover of the MRN, add 1 to the number of attempt times for executing the inter-base station handover of the MRN; and a fourth counter, configured to, based on that the judgement result of the second judging element is that this handover is the intra-base station handover of the MRN, add 1 to the number of attempt times for executing the intra-base station handover of the MRN.

12. The device according to claim 9, wherein the statistics component comprises:
- a first receiving element, configured to receive a message representing that an inter-base station handover is executed successfully;
- a third judging element, configured to, in the case where the one or more performance measurements on which statistics is indicated to be collected in the measurement job are the number of success times for executing the inter-base handover of the MRN and the number of success times for executing the inter-base handover of the UE, judge whether a current handover is the inter-base station handover of the MRN or the inter-base station handover of the UE;
- a fifth counter, configured to, based on that a judgement result of the third judging element is that this handover is the inter-base station handover of the MRN, add 1 to the number of success times for executing the inter-base handover of the MRN; and
- a sixth counter, configured to, based on that the judgement result of the third judging element is that the inter-base station handover of the UE, add 1 to the number of success times for executing the inter-base handover of the UE.

13. The device according to claim 9, wherein the statistics component comprises:
- a second receiving element, configured to receive a message representing that an intra-base station handover is executed successfully;
- a fourth judging element, configured to, in a case where the one or more performance measurements on which statistics is indicated to be collected in the measurement job is the number of success times for executing the intra-base handover of the MRN, judging whether a current handover is the intra-base station handover of the MRN or the inter-base station handover of the MRN; and
- a seventh counter, configured to, based on that a judgement result of the fourth judging element is that this handover is the intra-base station handover of the MRN, add 1 to the number of success times for executing the intra-base handover of the MRN.

14. A device for handover statistics, located in a management system, comprising:
- a determining component, configured to determine a measurement job, wherein the measurement job is used for indicating to collect statistics on one or more performance measurements of an inter-base station handover of a User Equipment (UE), and on at least one of the following performance measurements for a Mobile Relay Node (MRN): one or more performance measurements of an inter-base station handover of the MRN and one or more performance measurements of an intra-base station handover of the MRN; and
- a sending component, configured to send the determined measurement job to a base station, wherein the base station collects statistics on the one or more performance measurements indicated in the measurement job.

* * * * *